(12) United States Patent
Vendrow

(10) Patent No.: US 9,125,035 B2
(45) Date of Patent: *Sep. 1, 2015

(54) CALL PREVIEW SYSTEM

(71) Applicant: Ring Central, Inc., San Mateo, CA (US)

(72) Inventor: Vlad Vendrow, San Mateo, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,644

(22) Filed: Jul. 31, 2014

(65) Prior Publication Data

US 2015/0004953 A1    Jan. 1, 2015

Related U.S. Application Data

(63) Continuation of application No. 13/930,661, filed on Jun. 28, 2013, now Pat. No. 8,831,191.

(51) Int. Cl.
*H04M 1/64* (2006.01)
*H04M 11/00* (2006.01)
*H04M 1/56* (2006.01)
*H04M 15/06* (2006.01)
*H04M 3/42* (2006.01)
*H04W 4/16* (2009.01)
*H04M 3/436* (2006.01)

(52) U.S. Cl.
CPC ............ *H04W 4/16* (2013.01); *H04M 3/42042* (2013.01); *H04M 3/42059* (2013.01); *H04M 3/436* (2013.01); *H04M 3/42382* (2013.01); *H04M 2203/2038* (2013.01); *H04M 2203/654* (2013.01)

(58) Field of Classification Search
CPC . H04M 3/42042; H04M 7/006; H04M 67/26; H04M 1/72547; H04M 3/436

USPC .................. 455/412.1, 412.2, 414.1, 415; 379/88.11, 88.12, 88.13, 88.19, 88.2, 379/88.23, 93.17, 93.23, 142.01, 142.04, 379/142.17, 142.06, 142.09, 207.14

See application file for complete search history.

(56) References Cited

U.S. PATENT DOCUMENTS

| 5,838,923 | A  | 11/1998 | Lee |
| 6,065,016 | A  | 5/2000  | Stuntebeck |
| 6,327,353 | B1 | 12/2001 | Fukuzawa |
| 6,853,711 | B2 * | 2/2005 | Brisebois et al. ........ 379/142.06 |
| 6,961,410 | B1 | 11/2005 | Castanaga |
| 7,013,132 | B2 | 3/2006  | Kehr |
| 7,027,575 | B1 | 4/2006  | Burgess |
| 7,245,712 | B2 | 7/2007  | Hines |
| 8,126,120 | B2 | 2/2012  | Stifelman |

(Continued)

*Primary Examiner* — Binh Tieu
(74) *Attorney, Agent, or Firm* — Stolowitz Ford Cowger LLP

(57) ABSTRACT

A caller may initiate a phone call to a device. A call preview system may send a preview message in conjunction with the phone call. The preview message may contain preview information that identifies the caller. The call preview system may use a text or media messaging service to send the preview message. Callers can manage their own preview information relieving each user from continuously updating contact information in personal contact directories. The call preview system may use different schemes for initiating phone calls. In one example, the call preview system may initiate or forward phone calls in conjunction with sending the preview message. In another example, the call preview system may delay calling a phone number or delay forwarding the phone call until a message is received acknowledging the preview message or accepting the phone call.

19 Claims, 10 Drawing Sheets

(56) References Cited

U.S. PATENT DOCUMENTS

| | | |
|---|---|---|
| 8,126,125 B2 | 2/2012 | Koch |
| 8,134,727 B1 | 3/2012 | Shmunis |
| 8,189,760 B2 | 5/2012 | Levine |
| 8,265,247 B2 | 9/2012 | Baccay |
| 8,265,589 B2 | 9/2012 | Heit |
| 8,396,046 B2 | 3/2013 | Nagasawa |
| 8,498,405 B2 | 7/2013 | Siegrist |
| 8,553,864 B2 | 10/2013 | Chatterjee |
| 2003/0081753 A1 | 5/2003 | Trandal |
| 2003/0147519 A1 | 8/2003 | Jain |
| 2005/0059384 A1 | 3/2005 | Kuusinen |
| 2005/0267766 A1 | 12/2005 | Galbreath |
| 2005/0289471 A1* | 12/2005 | Thompson et al. ........... 715/751 |
| 2006/0035632 A1 | 2/2006 | Sorvari |
| 2006/0052091 A1 | 3/2006 | Onyon |
| 2006/0067498 A1 | 3/2006 | Plas |
| 2006/0072726 A1 | 4/2006 | Klein |
| 2006/0148459 A1* | 7/2006 | Wolfman et al. ............. 455/415 |
| 2007/0043688 A1 | 2/2007 | Kountz |
| 2007/0066288 A1 | 3/2007 | Soelberg |
| 2007/0127640 A1 | 6/2007 | Brunel |
| 2007/0130256 A1 | 6/2007 | Moore |
| 2007/0198677 A1 | 8/2007 | Ozhan |
| 2008/0013712 A1 | 1/2008 | Gopinath |
| 2008/0044031 A1 | 2/2008 | Mishra |
| 2008/0152124 A1 | 6/2008 | Ericson |
| 2008/0275865 A1 | 11/2008 | Kretz |
| 2009/0043805 A1 | 2/2009 | Masonis |
| 2009/0076902 A1 | 3/2009 | Grinsted |
| 2009/0177744 A1 | 7/2009 | Marlow |
| 2009/0281877 A1 | 11/2009 | Bezos |
| 2010/0130228 A1 | 5/2010 | Vendrow |
| 2011/0087661 A1 | 4/2011 | Quick |
| 2011/0099211 A1 | 4/2011 | Hyatt |
| 2011/0110511 A1 | 5/2011 | Vendrow |
| 2011/0130168 A1 | 6/2011 | Vendrow |
| 2011/0177797 A1 | 7/2011 | Vendrow |
| 2011/0191441 A1 | 8/2011 | Herriman |
| 2011/0246512 A1 | 10/2011 | Lubarski |
| 2012/0087302 A1 | 4/2012 | Chaturvedi |
| 2012/0228974 A1 | 9/2012 | Rinaolo |
| 2013/0195258 A1 | 8/2013 | Atef |
| 2013/0336311 A1* | 12/2013 | Laasik et al. ................... 370/352 |
| 2014/0105375 A1* | 4/2014 | Trinh et al. ............. 379/142.09 |
| 2014/0115086 A1 | 4/2014 | Chebiyyam |
| 2014/0370812 A1* | 12/2014 | Mauney et al. .............. 455/41.2 |

* cited by examiner

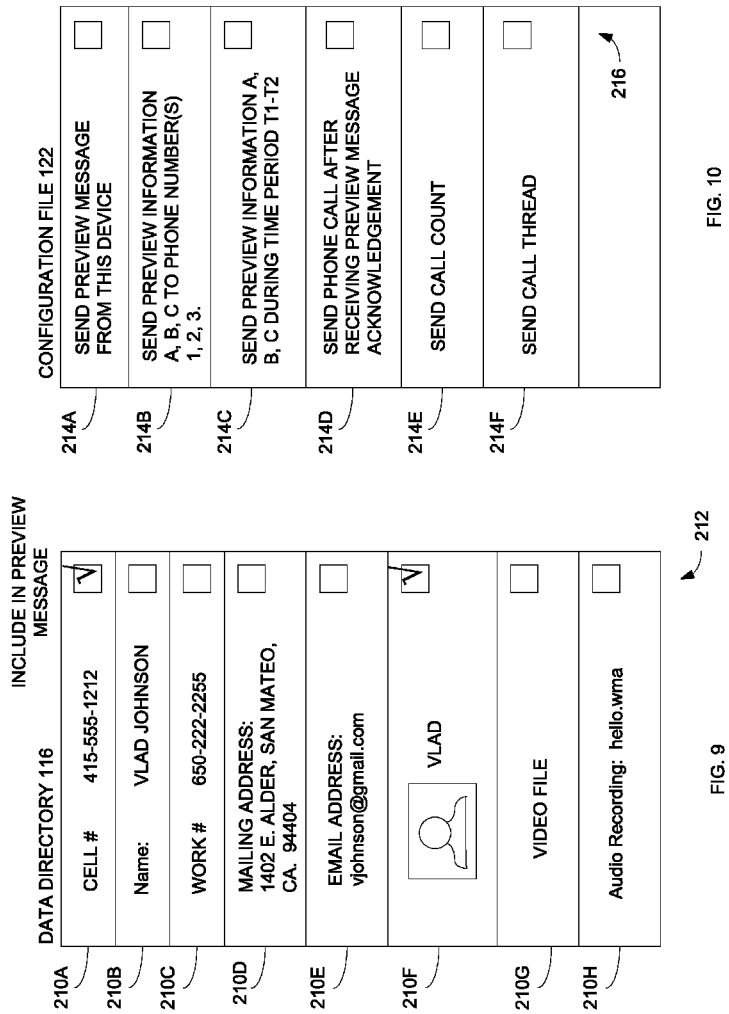

CALL PREVIEW SYSTEM

The application is a continuation patent application of U.S. patent application Ser. No. 13/930,661 filed Jun. 28, 2013 entitled "CALL PREVIEW SYSTEM," which is herein incorporated by reference in its entirety.

BACKGROUND

Cellular telephone systems may use caller identification (caller ID) to screen phone calls. The cell phone may store contact information containing names and phone numbers of persons or entities. The cell phone may compare a phone number of an incoming phone call with phone numbers in the contact information. The cell phone may display a name in the contact information that matches the phone number of the incoming phone call.

When no contact information matches the phone number of the incoming phone call, the cell phone only displays the telephone number. The user then must choose to answer the phone call or decline to answer the phone call based only on the phone number displayed on the cell phone.

Users must constantly update contact information with new phone numbers, home addresses, telephone addresses, etc. Even with constant updates to the contact information, unknown callers are still only identified by the phone number of the incoming phone call. Phone numbers alone provide little or no information about the identity of the caller. Thus, cell phones may not provide sufficient preview information for screening phone calls.

BRIEF DESCRIPTION OF FIGURES

FIG. 9 depicts an example data file containing preview information
FIG. 10 depicts an example configuration file used by the call preview system.

DETAILED DESCRIPTION

A call preview system uses text messages or media messages to preview phone calls. A caller may initiate a phone call to a device. The call preview system may send a preview message to the device in conjunction with the phone call. The preview message contains preview information about the caller and is displayed on the device. The preview message may be a text message such as a short message service (SMS) and/or a data message such as a multimedia messaging service (MMS) message.

Callers can manage their own preview information. This relieves device users from continuously updating contact information in personal contact directories. The call preview system may display preview information even for unfamiliar callers that are not in the personal contact directories.

The preview messages may contain any type of data, including text or media. For example, the preview message may contain a name and address of the caller. The preview message also may contain image, video, audio, or contact details (e.g., vCard) of the caller. The caller may use a configuration file to control what preview information is sent in the preview message and when different types of preview information are sent in the preview message. For example, the caller may send text data to a first phone number and may send a picture or audio data to a second phone number.

The call preview system may use different schemes for initiating phone calls. In one example, the call preview system may send the preview message and the associated phone call to a call receiving device at around the same time. In another example, the call preview system may initiate or forward the phone call after the preview message has been acknowledged.

Figure 1:
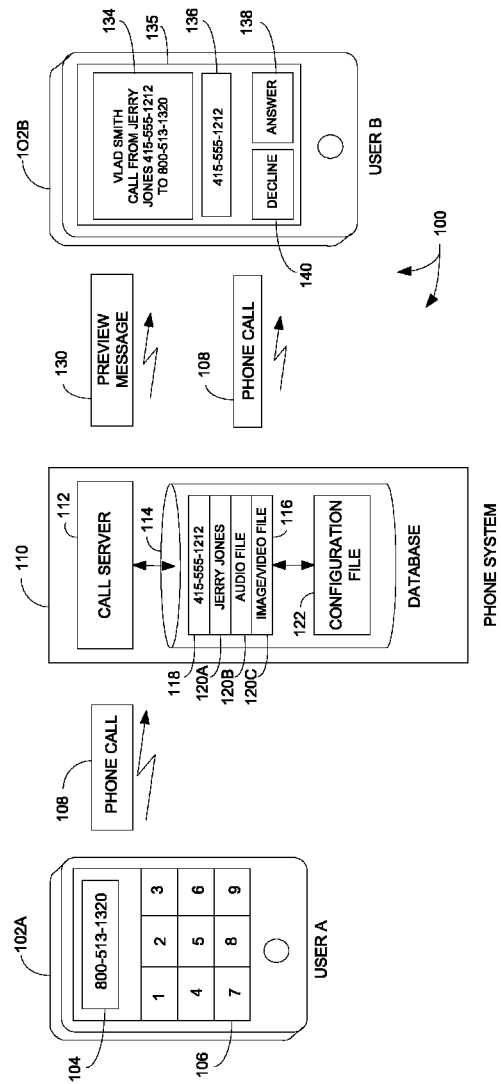
FIG. 1 depicts an example call preview system.

FIG. 1 depicts an example call preview system 100. A phone system 110 may comprise any combination of local area networks (LANs), wide area networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for establishing phone calls and transferring information between a device 102A and a device 102B. Phone system 110 also may include voice over Internet Protocol (VoIP) servers, gateways, routers, or the like, for relaying voice and/or data packets over voice/data network.

Phone system 110 also may comprise a call server 112 and a database 114. Call server 112 may comprise any computing system configured to receive and process phone calls and generate preview messages. Call server 112 may comprise multiple processing devices coupled together and communicating with database 114 via any combination of networks and/or buses as described above. In one example, phone system 110 and/or call server 112 may include, comprise, and/or operate a virtual public branch exchange (PBX) server, a short messaging service (SMS), and/or a multimedia messaging service (MMS) configured to send and receive text and/or media messages.

Devices 102A and 102B may comprise any computing device that can send and receive phone calls. For example, devices 102A and 102B may comprise tablet computers, hand-held devices, smart telephones, mobile telephones, personal digital assistants (PDAs), laptop computers, personal computers, computer terminals, voice over internet protocol (VoIP) phones, PSTN phones, plain old telephone service (POTS) phones, or the like, or any combination thereof. In one example, at least device 102B is configured to also receive text or media messages, such as SMS and MMS messages.

Database 114 may contain directories associated with different devices, including device 102A and device 102B. For example, a directory 116 may contain a phone number 118 for device 102A. Directory 116 also may include a text file 120A that contains the name of a user A for device 102A and any other text information that may identify user A. For example, text file 120A may include the home address, business phone, business address, and/or email address for user A.

Directory 116 also may include media files, such as an audio file 120B and/or an image or video file 120C. Audio file 120B may contain a recording of user A. For example, audio file 120B may comprise a moving picture experts group (MPEG) audio layer III (MP3) file containing a recording of the voice of user A saying something such as: "Hi, this is Jerry Jones." Image/video file 120C may comprise a picture or video of user A. For example, file 120C may comprise a portable document format (PDF) picture of Jerry Jones, a MP3 file containing a video of Jerry Jones, or a vCard containing contact information for Jerry Jones, which recipient can save to his or her own contacts.

A configuration file 122 may be associated with directory 116. Parameters in configuration file 122 may determine how phone system 110 forwards preview messages and voice calls. Directory 116 and configuration file 122 may be associated with device 102A and user A may selectively input or change preview data in directory 116 and parameters in configuration file 122. Other directories 116 and configuration files 122 may be associated with other devices and users.

User A may set a control parameter in configuration file 122 that directs call server 112 to load text file 120A into a preview message 130. In another example, configuration file 122 may direct call server 112 to load both text file 120A and image/video file 120C into preview message 130. Other parameters in configuration file 122 are discussed in more detail below.

User A may enter a phone number 104 into device 102A. Phone number 104 may be for device 102B. Device 102A then may initiate a phone call 108 to device 102B. Connection information in phone call 108 identifies both the phone number 104 for device 102B and the phone number 118 for device 102A. In this example, phone number 118 for device 102A is 415-555-1212 and phone number 104 for device 102B is 800-513-1320.

In response to receiving phone call 108, call server 112 associates the caller phone number 415-555-1212 with phone number 118 in directory 116. Call server 112 checks associated configuration file 122 for any control parameters previously set by user A. For example, the control parameters may identify what preview information in directory 116 to load into preview message 130.

Based on configuration file 122, call server 112 sends preview message 130 to device 102B. In this example, preview message 130 includes the name and address of user A. Preview message 130 also contains phone number 104 originally dialed by user A. For example, user A may have dialed a work number for user B. User B may have previously programmed call server 112 to forward business calls to device 102B.

In another example, user A may enter a specific preview message 130 to send to user B. User A may enter a specific preview message 130 manually or by selecting from a set of preconfigured preview messages. For example, the preview message 130 entered by user A may indicate the priority of the call (e.g., "urgent", "emergency") or the subject matter of the call (e.g., "dinner plans", "your appointment").

Device 102B displays preview information 134 contained in preview message 130 on screen 135. Before, during, or after receiving preview message 130, device 102B may receive phone call 108. Phone call 108 may include caller ID information 136 for device 102A. For example, phone call 108 may include the phone number 415-555-1212 for device 102A. Device 102B also may display caller ID information 136 on screen 135. Caller ID information 136 provides a visual correlation between preview information 134 and phone call 108. For example, preview information 134 and call ID information 136 contain the same caller phone number 415-555-1212. This notifies user B that preview information 134 is associated with incoming phone call 108.

Based on any combination of preview information 134 and/or caller ID information 136, user B may select a mechanical button or an electronic image or icon button 138 that answers phone call 108. Alternatively, user B may select a mechanical button or electronic image or icon button 140 to decline or disconnect phone call 108. Preview information 134 is managed by user A and not by user B. Thus, device 102B does not need to maintain a contacts directory containing the name and phone number of user A in order to display the name of the user A in response to receiving call 108.

The example in FIG. 1 shows phone system 110 maintaining database 114, directory 116, and configuration file 122 and sending preview message 130 to device 102B. In another example, device 102A may store and manage directory 116 and configuration file 122 for user A. An application operating in device 102A may detect user A selecting a call button to initiate phone call 108. The application on device 102A may load preview information 134 from a locally stored directory 116 into a preview message 130. The application on device 102A, instead of phone system 110, then may send the preview message to device 102B Any type of device 102A may send preview messages 130. A device 102A without a text message capability may use phone system 110 to send preview message 130. A device 102A with text message capability may send preview message 130 without using phone system 110. Thus, some directories 116 and associated configuration files 122 may be stored and managed centrally within phone system 110 and other directories 116 and associated configuration files 122 may be stored and managed locally on device 102A.

Since phone system 110 may generate preview messages 130 for some devices, device A may be any type of wired or wireless device, such as a cell phone, PSTN phone, POTS phone, analog phone, digital phone, Internet phone, computer, PC, notebook, or any other device that can initiate phone call 108. In at least one example, device 102B is any similar type of device that can also receive preview message 130, such as a device that can receive SMS or MMS messages.

Figure 2:
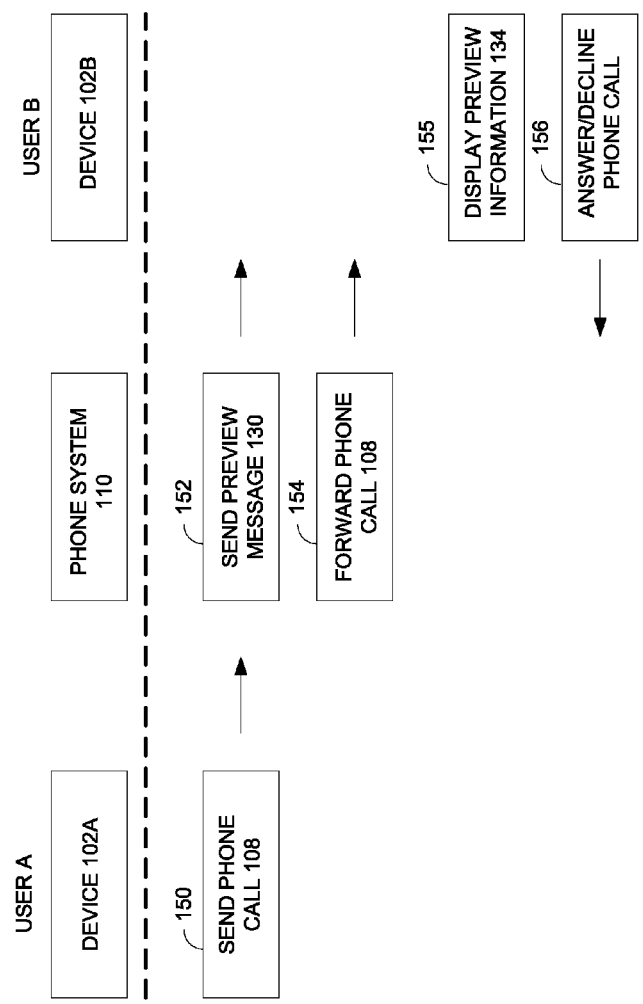
FIGS. 2-5 depict example operations performed by the call preview system.

FIG. 2 depicts one example of how the call preview system may send a preview message. Device 102A may initiate phone call 108 in operation 150. In operation 152, phone system 110 may send preview message 130 to device 102B in response to receiving phone call 108. In operation 154, phone system 110 also forwards phone call 108 to device 102B.

In operation 155, device 102B displays preview information 134 in preview message 130. In operation 156, user B either answers phone call 108 or declines phone call 108 based on the displayed preview information. If accepted, a phone connection is established between device 102A and 102B. If declined, phone call 108 is either disconnected or sent to voicemail for device 102B.

Figure 3:
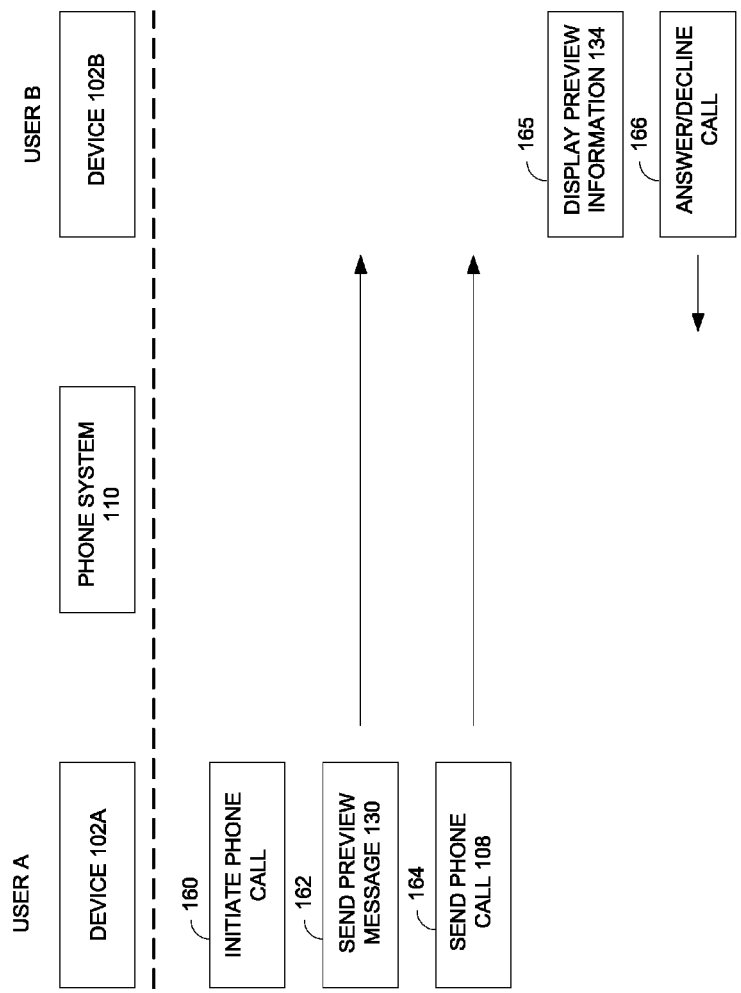

FIG. 3 depicts another example of how the call preview system may send preview messages. Device 102A may initiate phone call 108 in operation 160. For example, user A may enter a phone number into device 102A and press a call button. Operation 162 may send preview message 130 to device 102B in response to detecting selection of the call button. Operation 162 may be based on a field selected by the user in a configuration file. For example, the user may select a field in the configuration file that directs device 102A to send preview message 130 prior to sending phone call 108. After sending preview message 130, operation 164 sends phone call 108 by calling device 102B. For example, operation 164 may call the phone number previously entered by user A in operation 160.

Device 102B receives preview message 130 via a data messaging service, such as SMS or MMS and receives phone call 108 over a telephone service, such as a cellular telephone service. In operation 165, device 102B displays preview information 134 from preview message 130. User B views the preview information and either answers or declines phone call 108 in operation 166. If declined, phone call 108 may be directed to a voicemail system for device 102B. For example, phone system 110 may play a pre-recorded message to device 102A indicating user B is not available. User A then may leave a voice message in phone system 110 for user B.

Figure 4:
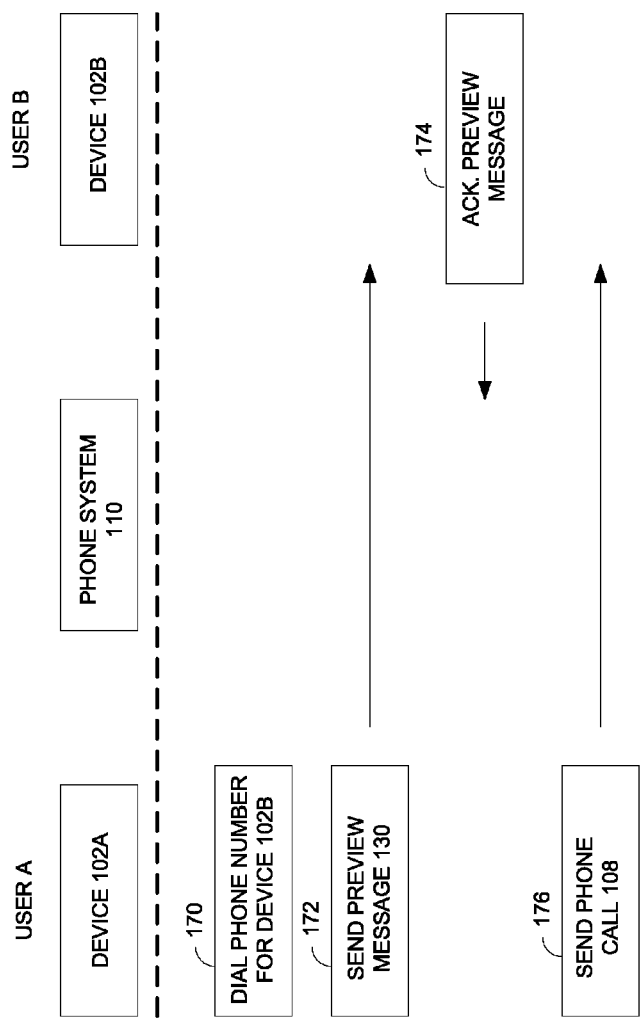

FIG. 4 depicts another example of how the call preview system may send preview messages. In operation 170, user A may enter a phone number for device 102B into device 102A. Operation 172 may send preview message 130 to device 102B in response to user A pressing the call button on device 102A.

In operation 174, device 102B may receive preview message 130 and automatically send an acknowledgment (ack) message back to device 102A. For example, device 102B may automatically send an SMS acknowledge message back to device 102A indicating successful receipt of preview message 130. Operation 176 may send phone call 108 to device 102B in response to receiving the acknowledgement message. For example, device 102A may call device 102A. Thus, preview message 130 is ensured of arriving before phone call 108.

Figure 5:
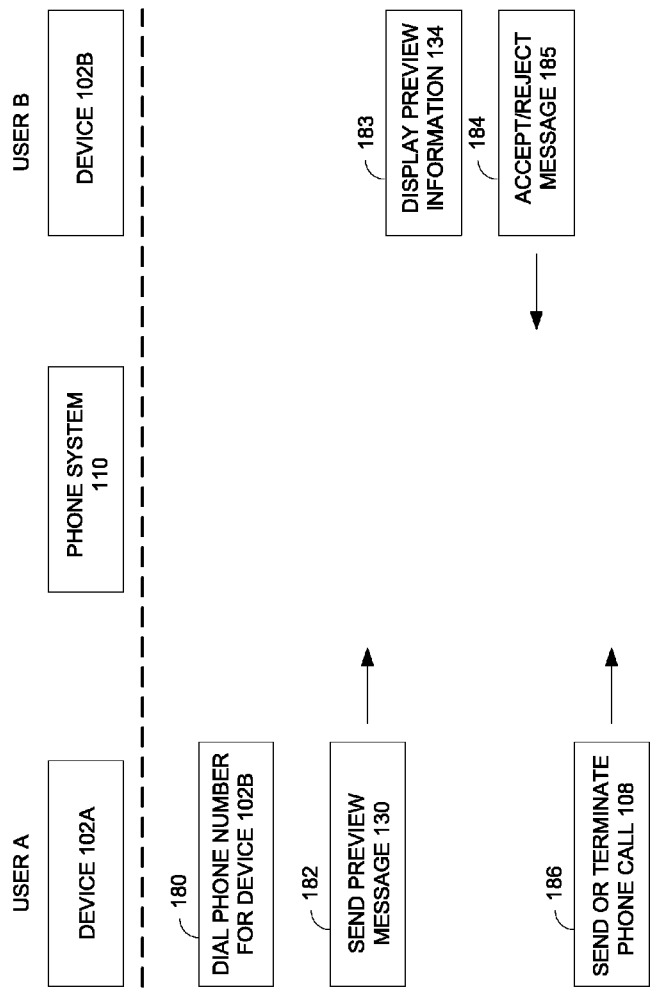

FIG. 5 depicts another example of how the call preview system may send preview messages. In operation 180, user A dials the phone number for device 102B. In operation 182, device 102A sends preview message 130 to device 102B in response to user A pressing the call button. Device 102B displays the preview information contained in preview message 130 in operation 183.

In operation 184, user B can either accept or reject the call associated with preview message 130. For example, user B may accept the call by selecting an accept icon displayed in the preview information 134 or user B may reject the call by selecting a decline icon displayed in preview information 134. Device 102B sends an accept/reject message 185 back to device 102A in response to the selection by user B. In one example, message 185 comprises an SMS message or MMS message.

In response to receiving message 185 back from device 102B, operation 186 may either send phone call 108 to device 102B or terminate phone call 130. For example, if message 185 accepts the call, device 102A may call the phone number previously entered into device 102A in operation 180. If message 185 rejects the call, device 102A may cancel phone call 108 by deleting the phone number previously entered into device 102A.

In another example, phone system 110 receives phone call 108 from device 102A and sends associated preview message 130 to device 102B. If message 185 rejects the call, phone system 110 may terminate phone call 108 or send phone call 108 to a voicemail box for device 102B.

In yet another example, device 102A may send preview message 130 without user A ever dialing the phone number for device 102B. For example, device 102A may display the contact information for user B. The contact information may include the phone number for device 102B. A contact software application operating on device 102A displays a phone icon for calling contacts. In response to selecting the phone icon, device 102A may send preview message 130 to device 102B.

Preview message 130 may include an "accept call" icon and a "reject call" icon. In another example, a software application for text messages on device 102B may display the "accept call" icon and the "reject call" icon in response to receiving preview message 130. In another example, a software application for text messages on device 102B may display an "accept call" hyperlink and a "reject call" hyperlink. The selection of the "accept call" or "reject call" hyperlink can result in the transmission of a corresponding data or text message back to device 102A. In another example, preview message 130 may include other responses such as "delay call for X minutes", "reject call—on the other line", or "reject call—busy with work". Either way, device 102B displays preview information 134 in preview message 130 identifying user A.

Device 102B sends message 185 back to device 102A in response to user B selecting the "accept call" or "reject call" icons. If message 185 accepts the call, device 102A automatically dials/sends the phone number in the contacts directory for device 102B. If message 185 rejects the call, device 102A does not dial/send the phone number. Device 102A also may display text in message 185 indicating the call request was either accepted or declined. If message 185 delays the call, device 102A may automatically call user B after the appropriate time period, or device 102A may remind user A to call user B after the appropriate time period.

Preview message 130 allows user B to preview a call request and either accept or reject the call request before device A sends phone call 108 to device 102B. Thus, device 102A can avoid sending phone calls that may disturb user B. Accepted phone calls have been preapproved by user B and are therefore are also less likely to disturb user B.

Preview message 130, device 102A, and/or device 102B may have time out values. User B may not respond within some amount of time after device 102A sends preview message 130. If a timeout period is detected, preview message 130 may be deleted, the "decline call" icon automatically selected, and/or the phone call automatically aborted.

User B may record a message on a voicemail system indicating that no phone calls will be answered prior to receiving a preview message 130 that identifies the caller. User B also may record a message on the voicemail answering indicating no calls will be answered unless user B first accepts preview message 130.

As mentioned above, either device 102A or phone system 110 may send preview messages 130. Either device 102A or phone system 110 also may receive responses to preview messages 130 from device 102B. It should be understood that any operations described above or below may be performed by any combination of phone system 110, device 102A, and/or device 102B.

Figure 6:
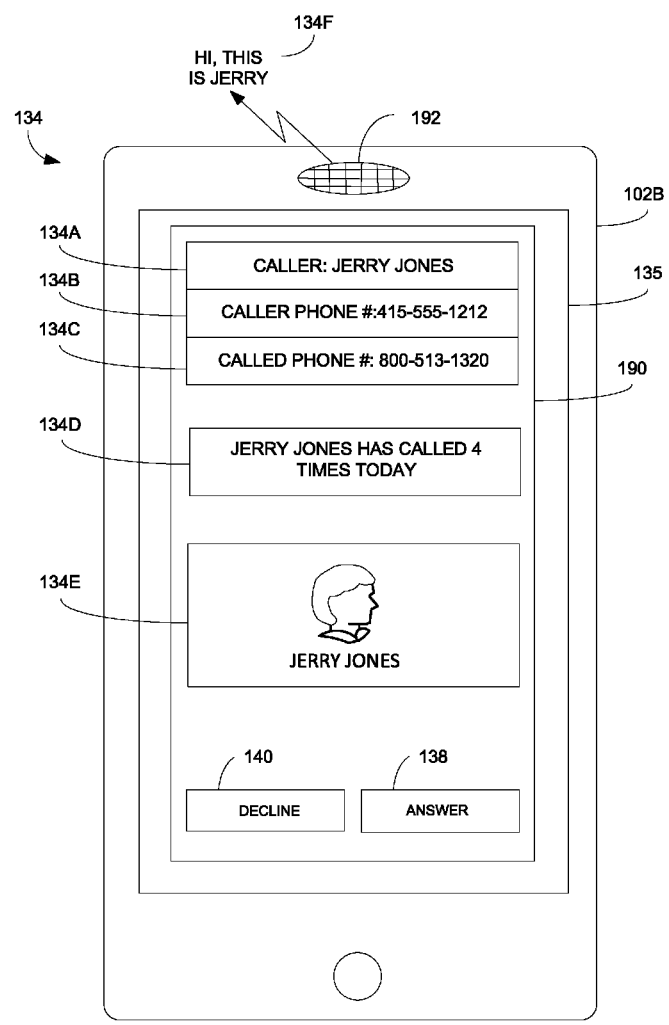
FIG. 6 depicts example call preview information.

FIG. 6 depicts on example of how device 102B may display preview information 134. In one example, device 102B may operate a message software application that displays an electronic page 190 within screen 135. The message application may display a decline button or icon 140 and an answer button or icon 138. In another example, preview information 134 may include decline button 140 and answer button 138.

Preview information 134 may include a name 134A of the caller, a phone number 134B of the device calling device 102B, and a phone number 134C the caller used for calling device 102B. As explained above, the phone number of phone 102B and phone number 134C may be different. For example, phone number 134C may be the work number for user B. A virtual PBX system may forward phone number 134C to the phone number associated with device 102B.

In one example, the calling device or device 102B may track the number of phone calls sent to device 102B. In another example, the calling device or device 102B may track the number of preview messages sent to phone 102B. The number is constantly tracked and loaded in directory 116 in FIG. 1. The calling device may load the number of calls and/or the number of preview messages into the preview message. Device 102B then displays the call or preview count 134D. Preview information 134 also may include a picture or video 134E of the caller. Preview information 134 also may include an audio file that plays audio 134F out of a speaker 192.

In response to selecting decline button 140, the call is not answered and may be sent to the voicemail for device 102B. In another example, device 102B sends a reply message in response to selection of decline button 140 that causes the calling device to abort sending a phone call to device 102B. If answer button 138 is selected, device 102B answers any previously sent phone call. In other example, selecting answer button 138 causes device 102B to send a reply message or acknowledgement to the calling device or to the phone system. The calling device then initiates the phone call to device 102B or the phone system then connects a previously received phone call to device 102B.

Figure 7:
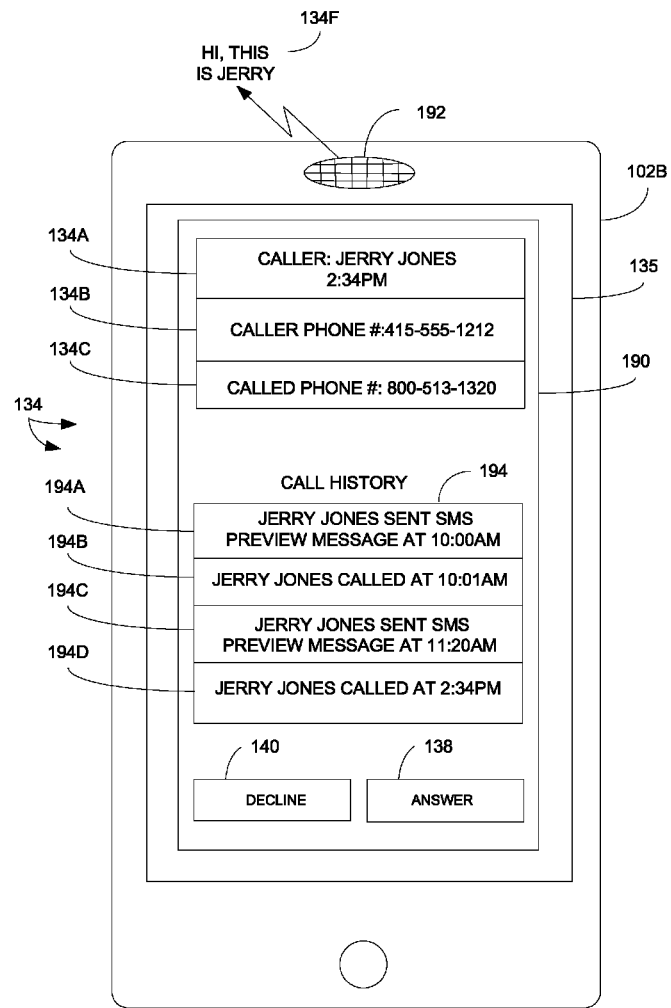
FIG. 7 depicts another example of call preview information.

FIG. 7 depicts another example of preview information. Device 102B again displays caller name 134A, caller phone number 134B, and called phone number 134C. In this example, the calling device tracks each preview message and phone call sent to device 102B. The calling device generates a call thread 194 that identifies all of the preview messages and phone calls sent to device 102B and the times each preview message and phone call was sent.

The calling device loads call thread 194 into the preview message and device 102B displays call thread 194 as part of preview information 134. For example, call thread 194 may include a preview message 194A sent to device 102B at 10:00 am, a phone call 194B sent to device 102B at 10:01 am, a preview message 194C sent to device 102B at 11:20 am, and a phone call 194D sent to device 102B at 2:34 pm. In another example, device 102B may track phone calls and preview messages received from callers and display call thread 194 whenever a phone call or preview message is received from the same associated caller.

Figure 8:
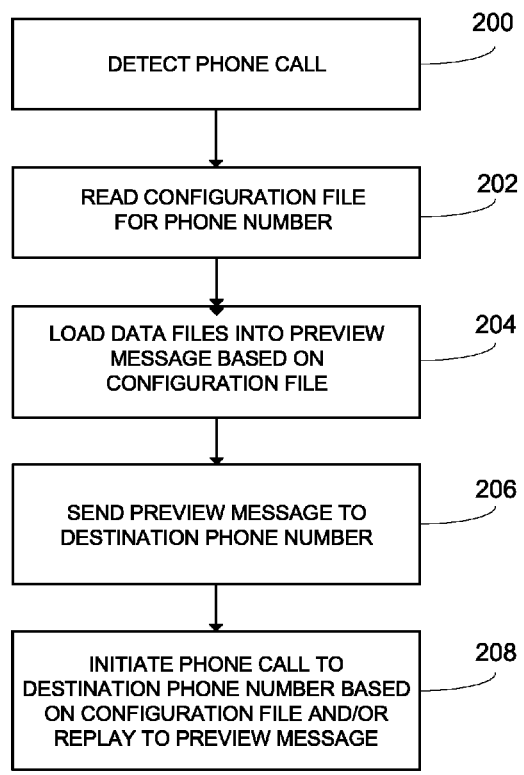
FIG. 8 depicts an example call preview process.

FIG. 8 depicts an example process for the call preview system. Operation 200 detects a phone call. As mentioned above, the phone call may be detected by the calling device or may be detected by a phone system that receives the call from the calling device. Operation 202 reads a configuration file associated with the calling device. The configuration file identifies what preview information to load into the preview message.

Operation 204 loads data files for the identified preview information into the preview message. For example, operation 204 may load a text file with the caller name and may load a PDF file with a picture of the caller. Operation 206 sends the preview message to the phone number in the phone call.

Operation 208 may initiate the phone call based on fields selected in the configuration file and based on any reply message received back in response to the preview message. For example, the caller may have set a field in the configuration file that causes the calling device to only send a phone call after receiving a reply message accepting the phone call. In another example, the caller may set a field in the configuration file that always sends phone calls after sending associated preview messages.

FIG. 9 depicts one example of different preview information that may be stored in data directory 116 and loaded into a preview message. A user may select different combinations of boxes 212 to identify which preview information to load into the preview message. Directory 116 may contain other preview information that also may identify the identity of the caller.

A phone number 210A may be the phone number of the calling device that is initiating the phone call. A name 210B may be the name of the caller that is making the phone call. A work number 210C may be the work number of the caller. A mailing address 210D may be the mailing address of the caller and an email address 210E may be the email address of the caller.

A picture 210F may be a picture of the caller or some other identifying image. Video file 210G may be a video of the caller or again some other identifying video. For example, the caller may provide a video introduction in video file 210G. An audio file 210H may be an audio recording of the caller or again any other identifying audio data.

FIG. 10 depicts an example of a configuration file 122. A user may select different combinations of boxes 216 to specify how preview messages are sent to different devices. It should be understood that configuration file 122 is just one example of control parameters and any variety of preview information may be sent in a preview message in any variety of different schemes.

A field 214A may enable the calling device to send the preview message. For example, the user might not need to select field 214A if a server operating in a phone system sends preview messages. Field 214B directs the device to send specified preview information to specified phone numbers. For example, the user may decide to send name 210B to all phone numbers and only send picture 210F to a selected set of phone numbers identified in field 214B. Field 214C configures the device to send different preview information at different times. For example, field 214C may direct the device sending the preview message to load name 210B and work phone number 210C into preview messages sent during work hours and direct the device to send name 210B and picture 210F during non-work hours and weekends.

Field 214D may direct the device to only send phone calls after receiving an acknowledgment of the preview message or an acceptance of the preview message. For example, the user may enter a phone number into the calling device and press the call button. The calling device may first send the preview message to the target device. The user of the device receiving the preview message may read the preview information and send a text message back to the calling device accepting the phone call. The calling device may complete the phone call after receiving the message back from the target device.

In the phone system example, the phone server may receive the phone call from the calling device and send the preview message. If file 214D is selected, the phone server forwards the phone call after receiving the replay message back from the target device.

Field 214E may direct the calling device or the phone server to count the number of phone calls and/or preview messages sent to a same phone number. The calling device or phone server loads the count number into the preview message sent to the associated target device.

Field 214F may direct the calling device, phone server, or the target device to generate a call thread for the preview messages and the phone calls. For example, the calling device or the phone server may store phone calls sent from the calling device to the same phone number. In another example, the receiving device or the phone server may track all of the phone calls and preview messages received from a same caller. When the target device receives another phone call or preview message from the same caller, the target device may display the thread identifying in chronological order each phone call and preview message previously received from the caller.

Figure 11:
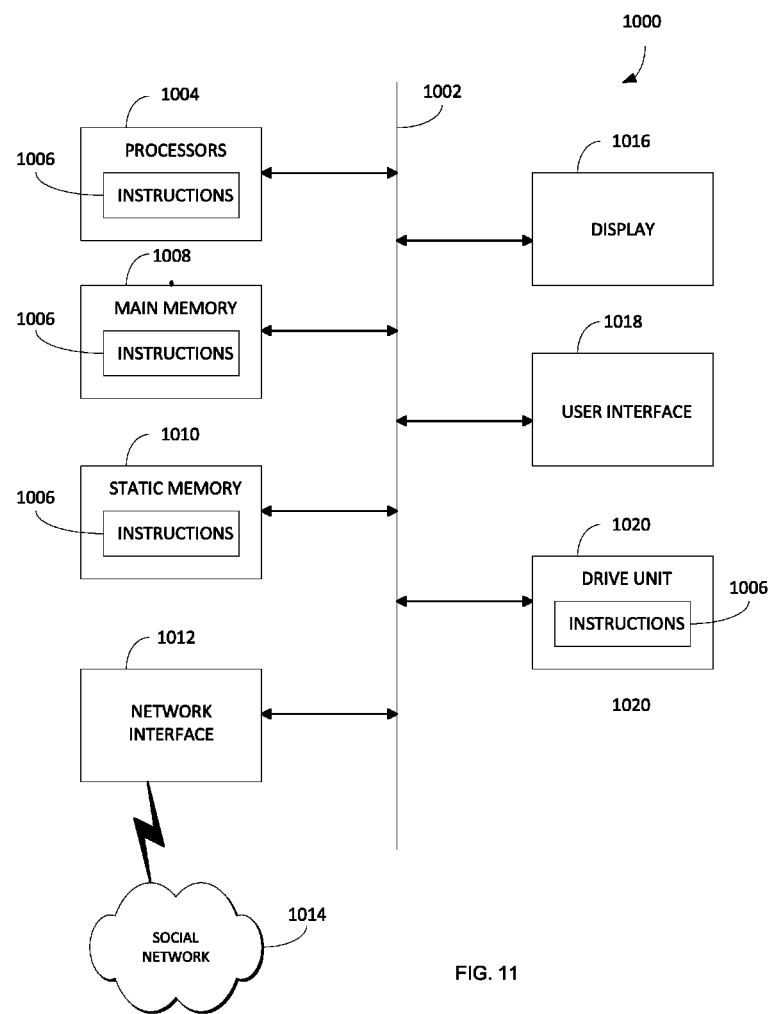
FIG. 11 depicts an example computing system for implementing the call preview system.

FIG. 11 shows a computing device 1000 that may be used for operating the social analytic system and performing any combination of the social analytics discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   detecting, by a computing device, a phone call directed to a receiving device;
   identifying, by the computing device, preview information associated with the phone call wherein the preview information includes a list of previous voice calls and text messages from the calling device to the receiving device;
   sending, by the computing device, the preview information to the receiving device in a preview message in response to detecting initiation of the phone call; and
   connecting, by the computing device, the phone call to the receiving device responsive to receiving a response message in response to the preview message indicating acceptance of the phone call.

2. The method of claim 1, further comprising sending, by the computing device, a short message service (SMS) or a multimedia messaging service (MMS) message from a mobile phone to the receiving device containing the preview information.

3. The method of claim 1, further comprising:
   inserting, by the computing device, a delay time period into the preview message; and
   sending, by the computing device, the phone call to the receiving device after the delay time period based on the response message indicating a selection of the delay time period in the preview message.

4. The method of claim 1, wherein the preview information comprises audio, image, and/or video data identifying an identity of a user placing the phone call.

5. The method of claim 1, further comprising:
   detecting, by the computing device, initiation of the phone call over a phone network from a calling device;
   sending, by the computing device, the preview message as a text or media message over a data network to the receiving device in response to detecting initiation of the phone call over the phone network; and
   completing, by the computing device, the phone call over the phone network to the receiving device in response to receiving the response message over the data network.

6. The method of claim 1, further comprising:
   initiating, by the computing device, the phone call from a mobile phone;
   storing, by the computing device, the preview information in the mobile phone;

sending, by the computing device, the preview message from the mobile phone in response to detecting initiation of the phone call from the mobile phone.

7. The method of claim 6, further comprising sending, by the computing device, the phone call from the mobile phone to the receiving device in response to receiving the response message back from the receiving device.

8. The method of claim 1, wherein the response message is automatically sent by the receiving device upon successful receipt of the preview message.

9. An apparatus, comprising:
logic circuitry configured to:
detect a phone call initiated by a calling device and directed to a receiving device;
generate a preview message in response to detecting the phone call, wherein the preview message identifies a user of the calling device and includes a list of prior communications from the calling device to the receiving device;
send the preview message to the receiving device using a text or data service of a communication network; and
send the phone call to the receiving device over a separate phone service based on a reply message received back from the receiving device indicating acceptance of the phone call.

10. The apparatus of claim 9, wherein the logic circuitry is further configured to abort the phone call to the receiving device based on a reply message received back from the receiving device indicating rejection of the phone call, or based on no reply message received back from the receiving device.

11. The apparatus of claim 9, wherein the preview message comprises a thread of previous phone calls and/or preview messages sent from the calling device to the receiving device.

12. The apparatus of claim 9, wherein the phone call comprises a cellular phone call and the preview message comprises a short messaging service (SMS) message or multimedia messaging service (MMS) message.

13. The apparatus of claim 9, wherein the logic circuitry comprises a server.

14. The apparatus of claim 9, wherein the logic circuitry operates on the calling device and the calling device comprises a cellular telephone.

15. The apparatus of claim 9, wherein the logic circuitry is further configured to:
store preview information editable by the user; and
load at least some of the preview information into the preview message.

16. The apparatus of claim 9, wherein the logic circuitry is further configured to:
store user editable configuration data; and
determine when to send the preview message to the receiving device based on the configuration data.

17. The apparatus of claim 16, wherein the logic circuitry is further configured to:
identify a number of phone calls and/or preview messages sent to the receiving device; and
identify the number of phone calls and/or preview messages in the preview based on the configuration data.

18. A mobile calling device, comprising:
a memory containing preview information associated with the mobile calling device, wherein the preview information identifies a user of the mobile calling device and includes prior communications from the calling device to a receiving device; and
logic circuitry configured to:
detect a phone number for the receiving device;
load the preview information into a preview message;
send the preview message to the receiving device over a first network; and
use the phone number to call the receiving device over a second network in response to receiving a response message back from the receiving device over the first network indicating acceptance of the phone call.

19. The mobile calling device of claim 18, wherein:
the first network comprises a text messaging service or media messaging service network; and
the second network comprise a telephone network.

* * * * *